Nov. 22, 1960 YAO TZU LI 2,960,941
VEHICLE STABILIZER
Filed May 16, 1957
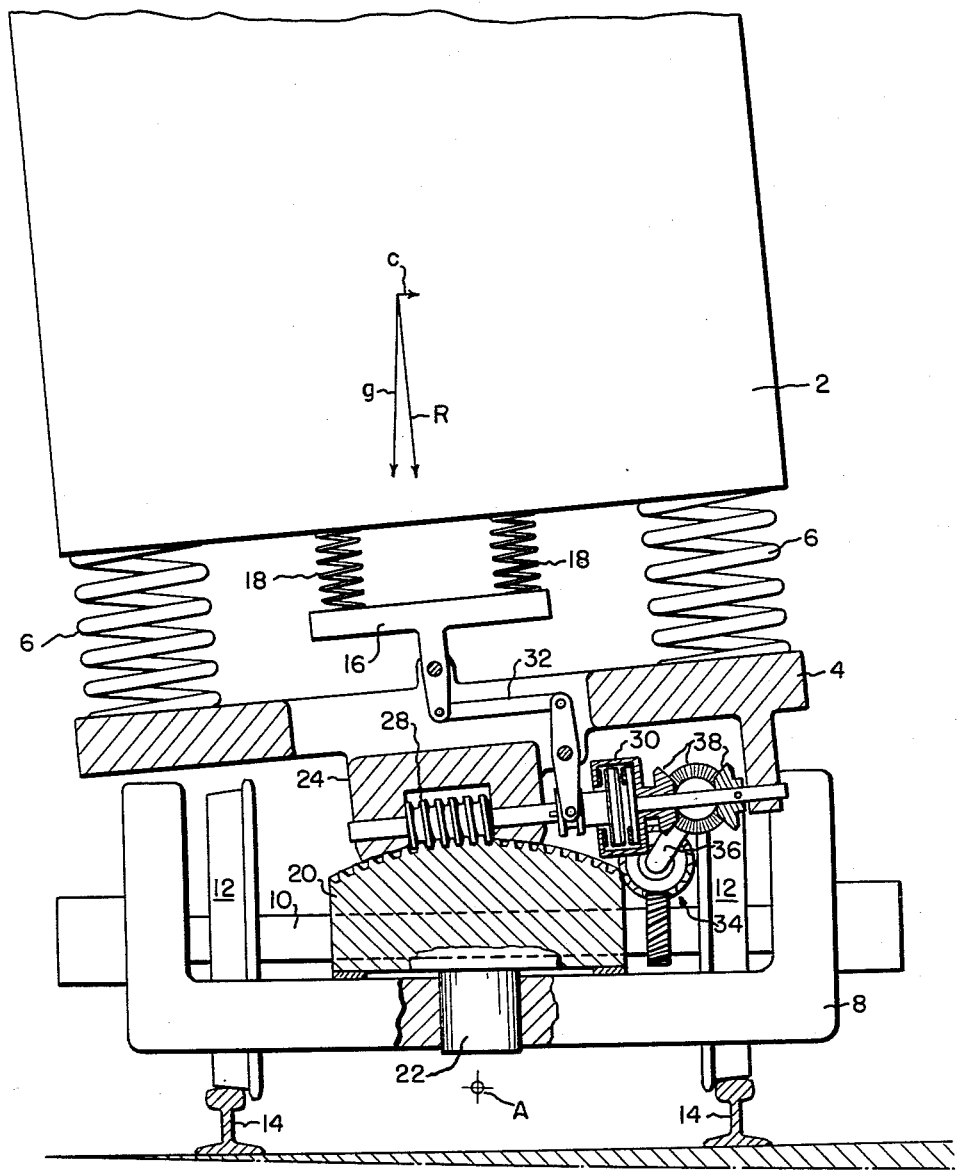
INVENTOR.
YAO TZU LI
BY KENWAY, JENNEY, WITTER & HILDRETH
ATTORNEYS

United States Patent Office 2,960,941
Patented Nov. 22, 1960

2,960,941

VEHICLE STABILIZER

Yao Tzu Li, Watertown, Mass. (Massachusetts Institute of Technology, 77 Massachusetts Ave., Cambridge 39, Mass.)

Filed May 16, 1957, Ser. No. 659,590

4 Claims. (Cl. 105—164)

The present invention relates to vehicle stabilizers and more particularly to apparatus for maintaining a vehicle body in a mechanically stable condition on a curved roadway.

In the operation of a vehicle under curved road conditions, as in the case of a railroad car on curved rails, the car should bank inwardly to counteract the centrifugal force. This is accomplished with partial success by banking the rails themselves (or by banking the highway for automotive traffic) but such a bank is correct for one speed only.

In any case the object is to align the vehicle body with the direction of the apparent vertical during a turn. The apparent vertical is the line of the resultant forces due to gravity and centrifugal force. With a proper angle of bank for a particular speed the direction of the apparent vertical passes through a point which lies midway of the tracks formed by the wheels. If no bank is provided or if the bank is improper for the speed at which the vehicle is travelling, the car will tip (usually against the force of equalizer springs) and the direction of the apparent vertical will lie outside the midpoint. If the apparent vertical falls outside of the wheels the car will tip over.

Aside from the danger of overturning, the forces involved in going over a curved roadway are uncomfortable to the passenger whenever the vehicle body is not aligned with the apparent vertical. In the past attempts to align the car with the vertical have been made by allowing the car to tip in a gimbal structure on which the car is pivoted about an axis above its center of gravity. This allows the passengers to be aligned for maximum comfort but it increases the overturning moment.

The principal object of the present invention is to provide a vehicle stabilizing system in which the car body is automatically aligned with the direction of the apparent vertical, and further in which the apparent vertical passes through a point approximately midway between the wheel tracks so that the unbalance is reduced substantially to zero.

To this end the invention comprises a sensing device responsive to tilts of the car body itself together with servo means controlled by the sensing device for applying power to tilt the car body inwardly.

Another feature of the invention comprises means whereby the power for tilting the body comes from the forward motion of the vehicle itself.

The accompanying drawing is an elevation in semi-diagrammatic form of a railroad car embodying the features of the present invention.

In the drawing the car body 2 is mounted on the chassis 4 by means of equalizer springs 6 which are here shown as coil springs as in the conventional railroad car. In automotive vehicles these springs may be of the leaf type.

Journaled on the truck 8 are axles 10 on which are mounted the wheels 12. In the case of a railroad vehicle, the wheels run on rails indicated at 14. In the case of an automotive vehicle the wheels 12 may be considered to run in "tracks" which are determined by the wheel spacing.

Assuming that the drawing represents a view of the car looking forward, if a left turn is taken the body tends to tip to the right, thereby compressing springs 6 on the right-hand side and elongating the corresponding springs on the left-hand side. According to the present invention the relative motion of the body with respect to the chassis is utilized to control the application of power to the body and cause it to assume a stabilized position. To this end, a rocking platform 16, which may be termed a sensing platform, and is pivoted to the chassis 4. The platform is normally centralized with respect to the body by means of springs 18. The springs 18 act in the same manner as the springs 6, that is, on a left turn the right-hand spring will be compressed more than the left-hand spring. In other words, there will be a change of position between the sensing platform 16 and the chassis 4. It is preferred that the springs 18 be sufficiently stiff so that the platform 16 will usually assume a position parallel to the car body.

According to the present invention the angular shift between the chassis and the sensing platform is utilized to control a clutch through which driving power is applied to the body. To this end a bearing block 20 is supported on the truck 8, being pivoted at 22 to accommodate the necessary turning movement of the body relative to the truck in making a turn. The block has a convex upper surface to cooperate with the concave surface of a block 24 depending from the chassis. A part of the block 20 is formed as a worm gear 26 to be engaged by a worm 28 journaled in the block 24. The worm 28 is driven through a clutch 30 which is capable of being driven in either direction or of assuming a neutral position. The operation of the clutch is controlled by linkage 32 connected between the sensing platform 16 and the clutch.

The drive for the worm is preferably taken from the axle, so that the energy of the moving vehicle itself may be utilized to tilt the car body to the proper angle. A power take-off is provided through helical gears 34 connected through a shaft 36 to drive bevel gears 38, which are connected in a manner familiar to those skilled in the art to drive the clutch elements in opposite directions.

The operation is such that whenever there is a sufficient angle of tilt between the sensing platform and the chassis to engage the clutch, the worm is driven in the proper direction to move the body inwardly until the sensing platform 16 is restored to a neutral position with respect to the chassis. At that time the relative positions of the body, the chassis and the sensing platform will be perpendicular to the apparent vertical. In other words, they will have all tilted by the same angle. This is the condition illustrated in the drawing. Then the clutch is restored to neutral and the car retains its inwardly tilted position so long as the curvature remains constant. Upon a change of curvature the sensing platform causes the clutch to engage in one direction or the other to bring the parts to the proper angle. When the car goes out on the straight track again the body is restored to the true vertical.

In the tilted position the correct angle is given by the direction of the apparent vertical. The vector $g$ represents the force of gravity on the car body, and the vector $c$ represents the centrifugal force due to the passage of the car around the curve. The resultant force is along the line R, which is the apparent vertical. When the car is properly stabilized the resultant R passes through the point A which is midway between the wheels at the height of the rails. In the case of an automotive vehicle the point A is midway between the wheel "tracks" on the surface of the roadway itself.

This provides maximum stabilization since the apparent vertical is always moved to a position of complete balance. Furthermore the passengers are maintained in the position of maximum comfort and do not sense the body sways due to centrifugal force.

In the drawing, the rails are illustrated as having a slight bank, but the body is shown as having a somewhat greater angle of tilt than the bank angle; in other words, the drawing illustrates the condition in which the speed is greater than that which would give stabilization by the bank alone. It will be understood that the centrifugal force will apply a force tending to tear the rails from the ties (or to cause an outward skid in the case of an automotive vehicle), but the body is balanced so that maximum passenger comfort is attained and there is no overturning moment. It will be also understood that the actions occurring according to the invention are of relatively long periods, and there will be little or no effect on the high-frequency disturbances such as may occur from the usual small unevennesses of the roadbed or highway; such motions are accommodated in the usual manner by the springs and shock absorbers of the vehicle.

Although the sensing platform is shown as connected to the body through springs 18, these springs are stiff enough so that the platform is usually substantially parallel to the car body. The platform might be rigidly connected to the body, except for the necessity of springs to take up vertical motions of the car body relative to the chassis.

In a vehicle which is to run in either direction, as a railroad car, a reversing arrangement in the drive may be necessary to cause operation in the proper direction.

In general, the requisites are a rigid support (the chassis or platform 4), and a yielding suspension (springs 6) on which the body is mounted, together with means for sensing the apparent vertical, and a power drive controlled by the sensing means to turn the support to a position where the operation of the sensing means is nulled.

The sensing means may comprise any suitable gravity-sensitive element. From general principles of mechanics, any such element is inherently sensitive to accelerations, and hence to centrifugal accelerations, so that its position, apart from transient oscillations, gives the direction of the apparent vertical of the body. In the embodiment of the invention herein described, the body itself is utilized as the sensing element. The spring suspension of the body on the support 4 allows the usual cushioning action of the springs. The spring suspension system has an "axis of suspension" which is normally vertical when the vehicle is proceeding on a straight course and the springs 6 are equally stressed. The axis of suspension always lies along the apparent vertical when the springs are equally stressed, even though the body may be tilted from the true vertical, as in the condition shown in the drawing. When the springs are unequally stressed, the axis of suspension deviates from the apparent vertical, and it is this condition which results in the application of power until the deviation between the axis of suspension and the apparent vertical is nulled.

Having thus described my invention, I claim:

1. In a vehicle having an axle, wheels mounted on said axle, a chassis supported by said axle, a body connected to said chassis by suspension springs, the combination of a sensing member pivoted on the chassis, means connecting the sensing member and the body to maintain the sensing member in a substantially fixed angular relationship with the body and to permit relative vertical movements between the sensing member and the body, mounting means for the chassis, said mounting means being supported by the axle and providing for rotation of the chassis about a horizontal axis which extends longitudinally of the vehicle, said sensing member acting to detect an angular deviation from the normal relationship between the body and the chassis, driving means to effect said rotation of the chassis, and means controlled by the sensing member in response to said angular deviation to operate the driving means to rotate the chassis in a direction to null the deviation.

2. Apparatus according to claim 1 in which the driving means derives its power from the forward motion of the vehicle.

3. Apparatus according to claim 1 in which the sensing member comprises a platform below the body, said platform being connected with the body through stiff spring means to maintain a substantially uniform angular relationship between the body and the platform while permitting relative vertical movements between them.

4. In a vehicle having an axle, wheels mounted on said axle, a chassis supported by said axle, a body connected to said chassis by suspension springs, the combination of a sensing member pivoted on the chassis, means connecting the sensing member and the body to maintain the sensing member in a substantially fixed angular relationship with the body and to permit relative vertical movements between the sensing member and the body, mounting means for the chassis, said mounting means being supported by the axle and providing for rotation of the chassis about a horizontal axis which extends longitudinally of the vehicle, said sensing member acting to detect an angular deviation from the normal relationship between the body and the chassis, a two-way clutch, means driven by the axle and connected through said clutch to rotate the chassis in either direction, and means controlled by the sensing member to operate the clutch.

References Cited in the file of this patent

UNITED STATES PATENTS

| | | |
|---|---|---|
| 2,523,113 | Hanna et al. | Sept. 19, 1950 |
| 2,568,402 | Lynn | Sept. 18, 1951 |
| 2,633,811 | Poage | Apr. 7, 1953 |